Nov. 19, 1963 S. KRIZMAN 3,111,334
AUTOMOBILE IDLER ARM CONSTRUCTION
Filed Dec. 1, 1961 4 Sheets-Sheet 4

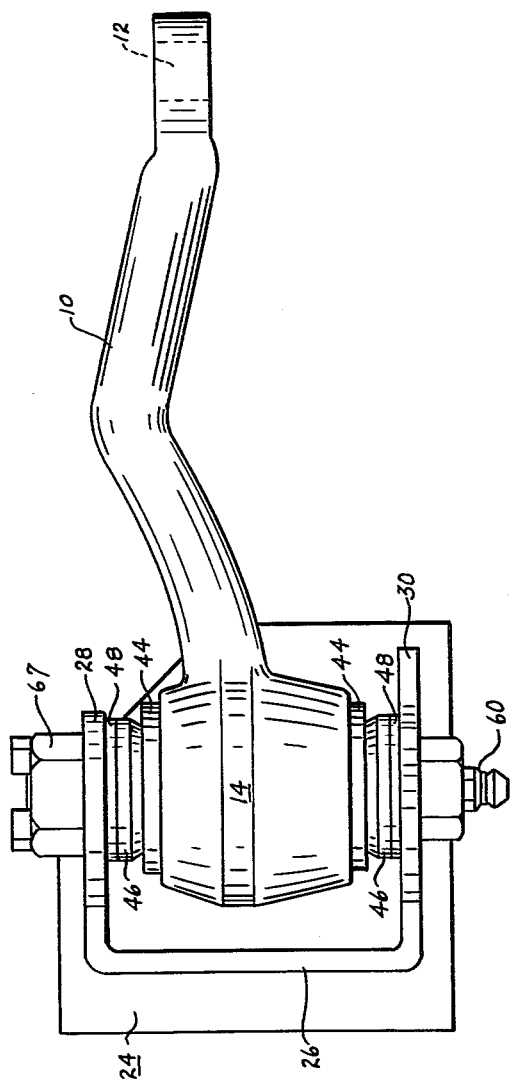

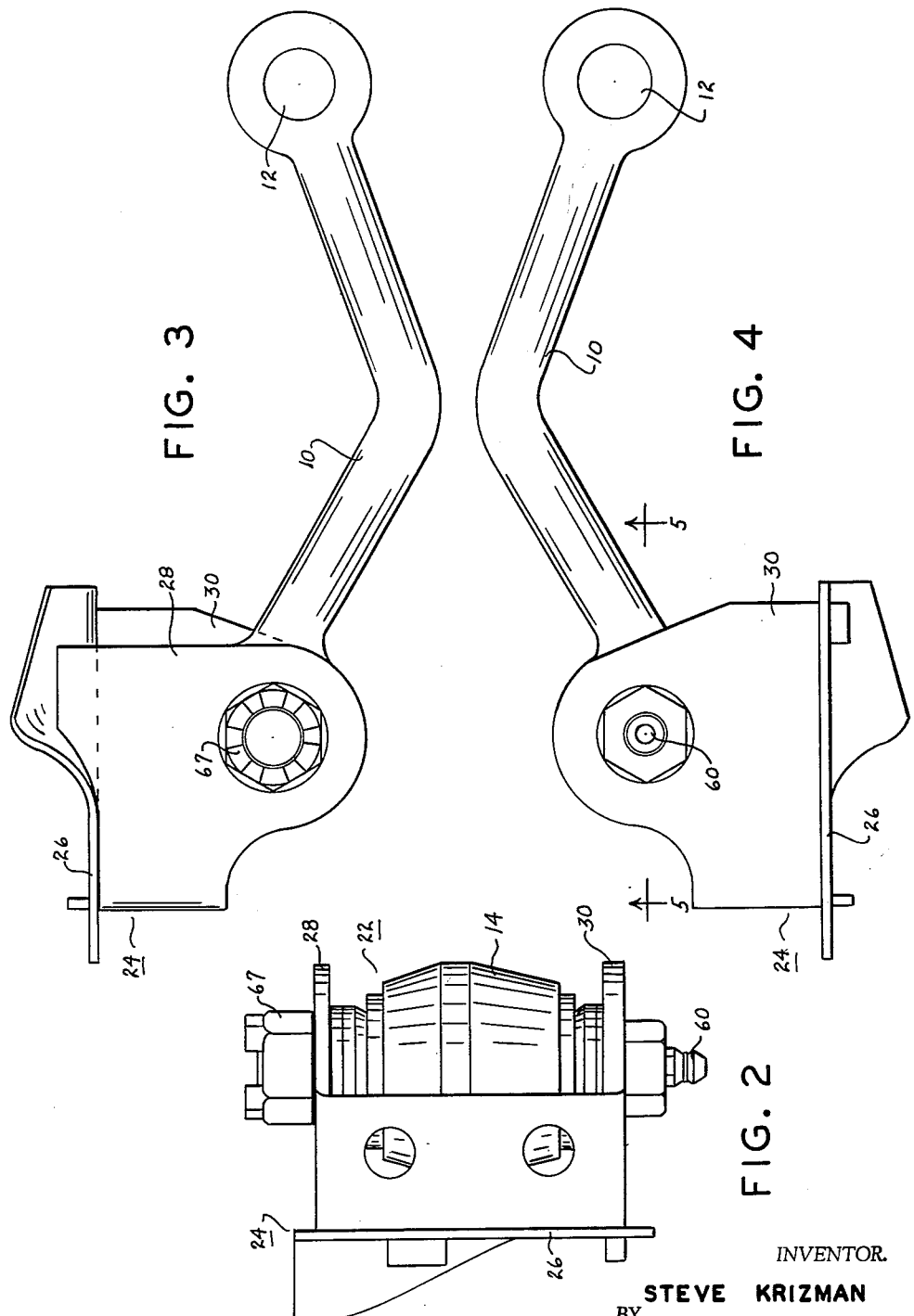

INVENTOR.
STEVE KRIZMAN
BY Hobbs & Easton
ATTORNEYS

United States Patent Office 3,111,334
Patented Nov. 19, 1963

3,111,334
AUTOMOBILE IDLER ARM CONSTRUCTION
Steve Krizman, South Bend, Ind., assignor to Krizman Manufacturing Co., Inc., South Bend, Ind., a corporation of Indiana
Filed Dec. 1, 1961, Ser. No. 156,324
7 Claims. (Cl. 280—95)

The present invention relates to a vehicle front wheel suspension construction and more particularly to an idler arm structure for use in the wheel suspension construction.

In the conventional front wheel suspension construction of a number of popular standard automobiles, the bearings for the rods become worn, and, while they continue to be usable, a substantial or serious amount of play develops in the suspension and steering mechanism, eventually requiring replacement of the bearings alone or the bearings and supporting structure, or substantial repairs thereto. The replacement of the bearings and bearing structure with standard manufacturers' items is often time consuming and involves a substantial amount of labor, which is inherently expensive and hence frequently neglected until the vehicle may become unsafe for the occupants of the car. One of the bearings and supporting structures which requires replacement from time to time is the idler arm which is pivotally supported on the frame of the vehicle and connected to the steering arm.

A brief description of the mechanism in which the aforementioned idler arm is used will be given in order to assist in a better understanding of the importance of the present invention in the wheel suspension construction. The fore and aft movement of each front wheel is controlled by a stabilizing structure fastened to the lower suspension arm to a point forward on the subframe of the vehicle. The steering sector shaft arm is connected to the spindle connecting rod on the left and to the steering arm-to-idler arm rod on the right. The idler arm rod is attached to the right side spindle connecting rod. The spindle connecting rods are adjustable in length, and the adjustment is secured by a suitable clamping means. The idler arm is in constant motion while the car is being driven, and any unnecessary looseness or play in the bearing resulting from wear causes difficulty in controlling the vehicle's steering.

It is therefore one of the principal objects of the present invention to provide a relatively simple bearing assembly for the aforementioned idler arm, which can be easily installed on the automobile as a replacement for the original idler arm bearing assembly and which will automatically and effectively adapt itself to the idler arm bearing seats and unavoidable misalignment in the fixtures for the idler arm.

Another object of the present invention is to provide a bearing assembly for the idler arm structure which effectively adapts itself to the arm when the assembly is originally installed and which continues throughout the operation of the automobile to remain properly adjustable and to be effectively adjusted with nothing more than occasional tightening from time to time to compensate for normal wear.

Still another object of the invention is to provide a replacement bearing assembly for the idler arm of an automobile front wheel suspension construction, which can be easily lubricated and which remains effectively lubricated over an extended period of time.

A further object is to provide a bearing assembly of the aforesaid type which is highly reliable in operation and sturdy in construction, and which is adapted to be used for extended periods of time without any repairs, adjustments or other attention in order to obtain optimum operating performance.

Another object of the invention is to provide an idler arm bearing assembly which can be easily installed by a service man without the use of any special skills or knowledge and with the use of only standard tools normally available in service stations and garages.

Additional objects and advantages of the present invention will become apparent from the following description and accompanying drawings, wherein:

FIGURE 1 is a side elevation of the present idler arm embodying the present bearing assembly mounted on the standard fixture of an automobile, with rubber seals omitted to better illustrate the structure;

FIGURE 2 is an end elevational view of the idler arm shown in FIGURE 1, mounted on the supporting fixture;

FIGURE 3 is a top plan view of the idler arm construction shown in FIGURE 2;

FIGURE 4 is a bottom view of the idler arm construction shown in the preceding figures;

Figures 7, 8:
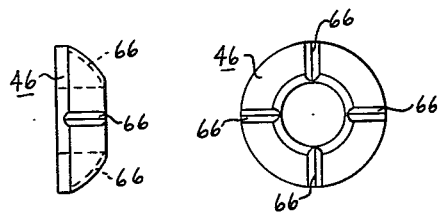
FIGURES 7 and 8 are side elevational and plan views of a bearing assembly insert.
Figures 9, 10:
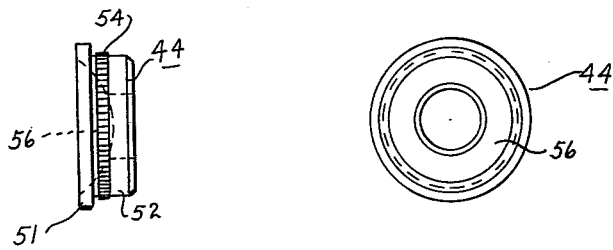
FIGURES 9 and 10 are side elevational and plan views of a bushing forming a part of the present bearing assembly.
Figure 5:
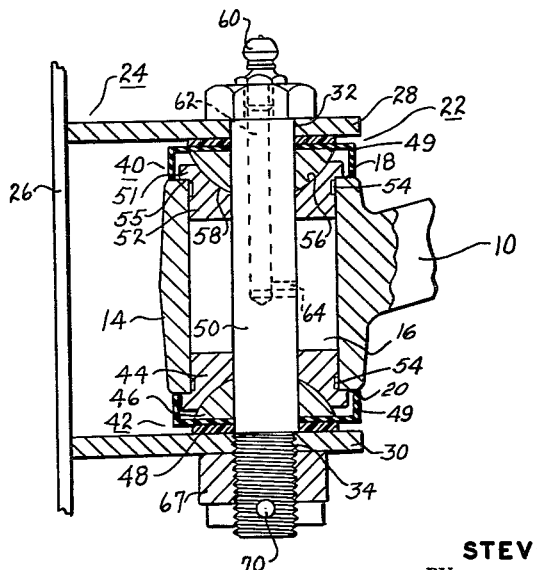
FIGURE 5 is a vertical cross sectional view of the idler arm embodying the present invention, the section being taken on line 5—5 of FIGURE 4.
Figure 6:
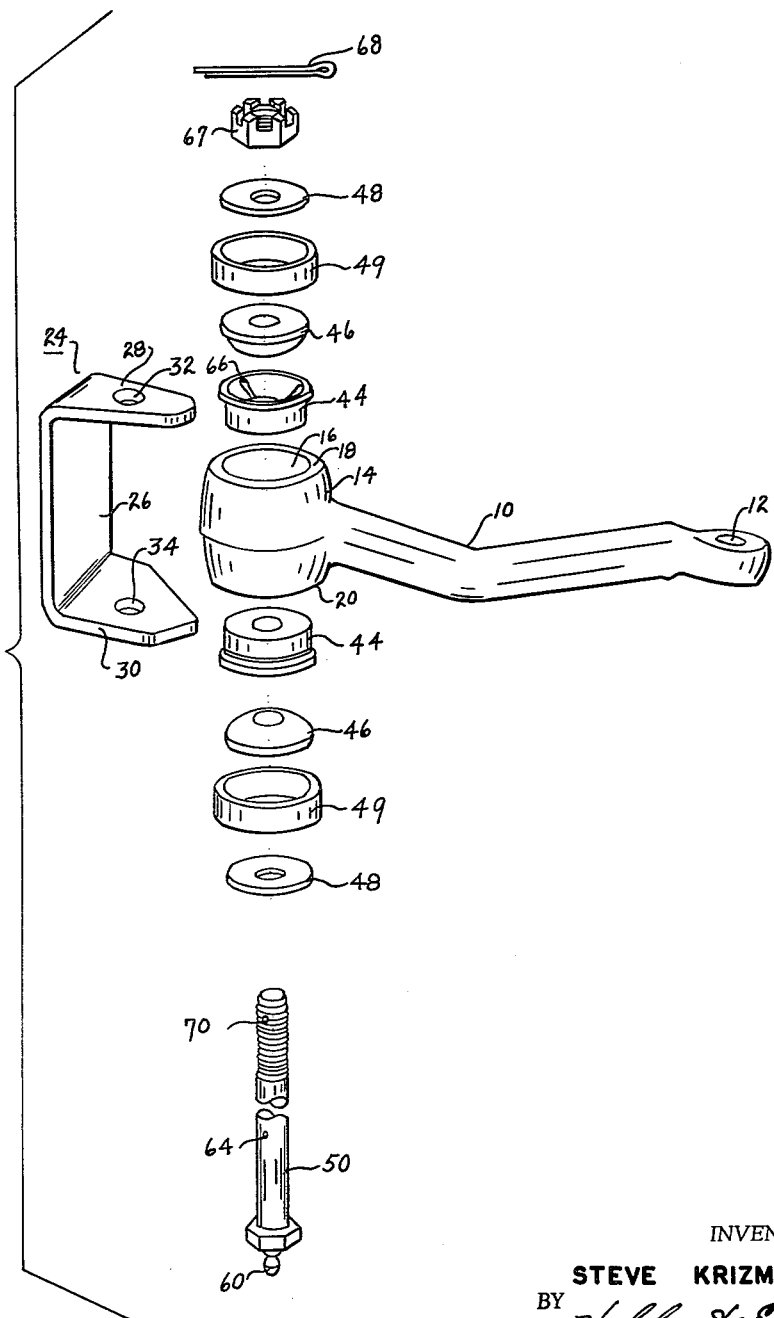
FIGURE 6 is an exploded view of the idler arm shown in the preceding figures, illustrating the various parts and components comprising the idler arm and the supporting fixture therefore.

Referring more specifically to the idler arm assembly shown in FIGURE 1, numeral 10 designates the idler arm having a hole 12 through the free end and a hub 14 at the other end thereof, the hub containing a straight cylindrical bore 16 terminating in annular surfaces 18 and 20 at the top and bottom, respectively, of the hub. This arm as described herein is of standard construction and used as original equipment in this form, the present bearing assembly being adapted to be installed without any modifications or changes first being required in the arm.

The arm and the present bearing assembly, generally designated by numeral 22, are supported by a fixture 24 secured to the vehicle frame (not shown) consisting of backing plate 26 and laterally extending plates 28 and 30, joined rigidly to backing plate 26. The two laterally extending plates are provided with aligned holes 32 and 34 in plates 28 and 30, respectively. The bearing assembly 22 consists of upper and lower bearing subassemblies 40 and 42, respectively, of identical construction, each part consisting of a bushing 44, insert 46 and washer 48. These three parts are provided with centrally located holes for receiving bolt or shaft 50. The bushing is provided with an external enlarged diameter portion 51 and an internal smaller diameter portion 52, the latter being of substantially the same diameter as bore 16 of hub 14, so that the bushing seats firmly therein in substantially fluid-tight relationship with the internal wall of the hub bore, and an annular knurled portion 54 may be provided on the external surface of smaller diameter portion 52 for rigidly gripping the internal wall of the hub. The flange or shoulder 55 formed by the larger diameter portion 51 seats on the external surfaces 18 or 20 of the hub. In the external side of bushing 44 is a substantially hemispherically-shaped internal side 58 of insert 46. The internal side of the insert and the concave recess are of the same radius and hence permit the insert and bushing to adjust themselves angularly with respect to one another when the parts are initially assembled. Washer 48 is preferably of neoprene or similar material and forms an oil seal around bolt 50 and normally seats on the flat external surface of inserts 46, and a sleeve 49 of neoprene or rubber may be placed over each bearing assembly 40 and 42 to protect them from dirt, grit and other foreign matter.

The present bearing assembly is lubricated by a lubricating fixture 60 of standard construction connected to bore 16 through longitudinal passage 62 in the center of bolt 50, and a radially extending passage 64 connected to passage 62 and opening into bore 16. Lubrication supplied through fixture 60 fills chamber 16 and works its way upwardly and downwardly through the bores in bushings 44 into the respective concave recesses 56, where it effectively lubricates the bearing on which arm 10 rotates. Radial grooves 66 are preferably provided in either the recess of bushing 44 or in the rounded surface 58 of insert 46 to assist in the lubrication of these parts.

When the idler arm embodying the present structure is assembled, bushings 44 are inserted in each end of bore 16 of hub 14, and the respective inserts and washers are assembled thereon. After this assembly is inserted between plates 28 and 30, bolt 50 is slipped through holes 32 and 34 in the two plates and through the bores in parts 44, 46 and 48, and secured in place by nut 67, the nut thereafter being held in place by a cotter key 68 placed in hole 70 in the end of the bolt. The bolt can be placed with the lubricating fixture either at the top or bottom, but it should be placed for convenience in lubricating the idler arm construction. This would normally be at the bottom.

After the bearing has been installed in the foregoing manner, the idler arm 10 and upper and lower bushings 44 rotate in unison on upper and lower inserts 46 with lubrication feeding into recesses 56 from bore 16. As normal wear occurs through extended use of the present bearing assembly, the assembly can be adjusted for long continued, satisfactory service by merely tightening nut 67 on bolt 50 after cotter key 68 has been removed from hole 70.

While only one embodiment of the present invention has been described in detail herein, various changes may be made to satisfy requirements.

I claim:

1. In an idler arm construction: an arm having a hub with a longitudinal bore therethrough, a bearing assembly at each end of said bore for pivotally supporting said arm, each assembly including a bushing having a reduced diameter portion for seating in one end of said bore and an enlarged diameter portion forming a shoulder for engaging an end of said hub, a concave recess in the external end of said bushing and a bore through the center thereof, a substantially hemispherically-shaped insert having a bore through the center thereof and seating in said recess for rocking adjustment and movement therein, a radial groove between the surfaces of said bushing and insert, a bolt having a longitudinal lubricating passage communicating with the bore in said hub, said bolt extending through all said bores.

2. An idler arm construction comprising a fixture having two spaced laterally extending supports with axially aligned holes therein, the arm having a hub with a longitudinal bore therethrough mounted between said supports, a bearing assembly at each end of said bore between said supports for pivotally supporting said arm, each assembly including a bushing having a reduced diameter portion for seating in one end of said bore and an enlarged diameter portion forming a shoulder for engaging an end of said hub, a concave recess in the external end of said bushing and a bore through the center thereof, a substantially hemispherically-shaped insert having a bore through the center thereof and seating in said recess for rocking adjustment and movement therein, a radial groove between the surfaces of said bushing and insert, a shaft extending through said bores and holes in said supports, and a means for securing said shaft in said bores and said supports, bearing assemblies and hub together.

3. An idler arm construction comprising a fixture having two spaced laterally extending supports with axially aligned holes therein, the arm having a hub with a longitudinal bore therethrough mounted between said supports, a bearing assembly at each end of said bore between said supports for pivotally supporting said arm, each assembly including a bushing having a reduced diameter portion for seating in one end of said bore and an enlarged diameter portion forming a shoulder for engaging an end of said hub, a concave recess in the external end of said bushing and a bore through the center thereof, an insert having a bore through the center thereof and seating in said recess for rocking adjustment and movement therein, a bolt extending through the aforesaid bores and the holes in said supports and a nut for securing said bolt in said bores and said supports, bearing assemblies and hub together.

4. An idler arm construction comprising a fixture having two spaced laterally extending supports with axially aligned holes therein, the arm having a hub with a longitudinal bore therethrough mounted between said supports, a bearing assembly at each end of said bore between said supports for pivotally supporting said arm, each assembly including a bushing having a reduced diameter portion for seating in one end of said bore and an enlarged diameter portion forming a shoulder for engaging an end of said hub, a concave recess in the external end of said bushing and a bore through the center thereof, a substantially hemispherically-shaped insert having a bore through the center thereof and seating in said recess for rocking adjustment and movement therein, a shaft having a longitudinal lubricating passage communicating with the bore in said hub extending through the aforesaid bores and holes in said supports, and a means for securing said shaft in said bores, bearing assemblies and hub together.

5. An idler arm construction comprising a fixture having two spaced laterally extending supports with axially aligned holes therein, an arm having a hub with a longitudinal bore therethrough mounted between said supports, a bearing assembly at each end of said bore between said supports for pivotally supporting said arm, each assembly including a bushing having a reduced diameter portion for seating in one end of said bore and an enlarged diameter portion forming a shoulder for engaging an end of said hub, a concave recess in the external end of said bushing and a bore through the center thereof, a substantially hemispherically-shaped insert having a bore through the center thereof and seating in said recess for rocking adjustment and movement therein, a radial groove between the surfaces of said bushing and insert, a shaft having a longitudinal lubricating passage communicating with the bore in said hub extending through the aforesaid bores and holes in said supports, and a means for securing said shaft in said bores and said supports, bearing assemblies and hub together.

6. An idler arm construction comprising a fixture having two spaced laterally extending supports with axially aligned holes therein, an arm having a hub with a longitudinal bore therethrough mounted between said supports, a bearing assembly at each end of said bore between said supports for pivotally supporting said arm, each assembly including a bushing having a reduced diameter portion for seating in one end of said bore and an enlarged diameter portion forming a shoulder for engaging an end of said hub, a concave recess in the external end of said bushing and a bore through the center thereof, a substantially hemispherically-shaped insert having a bore through the center thereof and seating in said recess for rocking adjustment and movement therein, a radial groove in the surface of said insert disposed in said recess, a bolt having a longitudinal lubricating passage communicating with the bore in said hub extending through the aforesaid bores and holes in said supports, and a nut for securing said bolt in said bores and said supports, bearing assemblies and hub together.

7. An idler arm construction comprising a fixture having two spaced laterally extending plates with axially aligned holes therein, the arm having a hub with a longitudinal bore therethrough mounted between said plates, a bearing assembly at each end of said bore between said supports for pivotally supporting said arm, each assembly including a cylindrical bushing having a reduced diameter portion for seating in one end of said bore and an enlarged diameter portion forming a shoulder for engaging an end of said hub, a substantially hemispherically-shaped recess in the external end of said bushing and a bore through the center thereof, a substantially hemispherically-shaped insert having a bore through the center thereof and seating in said recess for rocking adjustment and movement therein, a plurality of grooves in the surface of said insert disposed in said recess adjacent a fixture plate, a bolt having a longitudinal lubricating passage communicating with the bore in said hub extending through the aforesaid bores and holes in said supports, and a nut for securing said bolt in said bores and said bearing assemblies and hub together.

References Cited in the file of this patent

UNITED STATES PATENTS

| | | |
|---|---|---|
| 1,689,750 | Redfield | Oct. 30, 1928 |
| 2,788,221 | Pritchard | Apr. 9, 1957 |
| 3,010,733 | Melton | Nov. 28, 1961 |
| 3,010,746 | Melton | Nov. 28, 1961 |
| 3,030,133 | Rowlett | Apr. 17, 1962 |